United States Patent [19]

Green

[11] 4,318,267
[45] Mar. 9, 1982

[54] GRASS EDGING DEVICE

[76] Inventor: Robert W. Green, 2901 NW. 101 Ave., Miami, Fla. 33172

[21] Appl. No.: 192,686

[22] Filed: Oct. 1, 1980

[51] Int. Cl.³ .......................................... A01D 55/26
[52] U.S. Cl. ..................................... 56/13.7; 172/15
[58] Field of Search ............... 56/13.7, 396, 397, 398, 56/400, 375, 13.6; 172/643, 618, 389, 390, 391, 392, 393, 48, 58, 82, 26

[56] References Cited

U.S. PATENT DOCUMENTS

| | | | |
|---|---|---|---|
| 1,939,851 | 12/1933 | Horste | 36/25 |
| 2,171,761 | 9/1939 | Paradise et al. | 56/10.4 |
| 2,377,400 | 6/1945 | Campbell | 74/293 |
| 2,618,919 | 11/1952 | Hutchens | 56/13.7 |
| 2,663,137 | 12/1953 | Asbury | 56/295 |
| 2,908,127 | 10/1959 | Craig | 56/13.7 |
| 2,924,929 | 2/1960 | Albertson et al. | 56/13.7 |
| 2,938,397 | 5/1960 | Lemmetty | 74/330 |
| 3,115,739 | 12/1963 | Thoen et al. | 56/13.6 |
| 3,797,211 | 3/1974 | Turner | 56/15.6 |
| 3,918,240 | 11/1975 | Haffner et al. | 56/7 |
| 3,973,379 | 8/1976 | Ecker et al. | 56/11.9 |
| 3,977,475 | 8/1976 | Zugai | 56/233 |
| 3,992,858 | 11/1976 | Hubbard et al. | 56/7 |
| 4,077,190 | 3/1978 | Crites | 56/12.7 |
| 4,170,099 | 10/1979 | Owens | 56/13.6 |
| 4,175,622 | 11/1979 | Summerfelt | 172/14 |

*Primary Examiner*—Robert A. Hafer
*Attorney, Agent, or Firm*—Lerner, David, Littenberg & Samuel

[57] ABSTRACT

An edging device for trimming grass around the edges of objects set in the ground, in particular memorial markers and sidewalks in cemeteries. The edging device includes a vehicle and a frame supported thereby, and three trimmers carried by the frame for edging the sides of the object set in the ground, each of the trimmers being adapted to follow the contour of an edge of the object as the vehicle traverses past the object. Adjustment means are also provided for movably adjusting the position of one of the trimmers relative to the other trimmers so that different size objects may be trimmed. The trimmers preferably include rotatable trimmers which are mounted for rotation about horizontal axes and which includes flexible frailing elements.

15 Claims, 8 Drawing Figures

GRASS EDGING DEVICE

FIELD OF THE INVENTION

The present invention relates generally to grass trimmers or edging devices, and more particularly to a grass trimmer or edging device for trimming about memorial markers and/or sidewalks in cemeteries.

BACKGROUND OF THE INVENTION

In many cemeteries, sidewalks and substantially flat, low profile memorial markers are provided throughout the grounds. In some instances, the memorial markers, which may generally be rectangular in shape, are position or located so that one edge of the marker is adjacent the edge of a sidewalk. As with most any sidewalk or object set in the ground and having grass growing therearound, the grass tends to grow over the peripheral edges of the object, thereby presenting an unsightly or unkept appearance. This has presented a particularly serious and ongoing problem in the maintenance of cemeteries and has required laborious time consuming operations for edging or trimming of grass growing over the edges of memorial markers and sidewalks.

In the past, the edging or trimming of grass around the sidewalks and memorial markers in cemeteries has been accomplished manually using hand carried commercial edging devices. During peak growth periods, for example in the summer, by the time that the crew using the hand carried edgers finished the trimming around the memorial markers and the sidewalks, it was time to start the job over again. For example, in a typical cemetery having five miles of sidewalk and ten thousand markers, it has typically taken a crew of four persons with commercial edgers approximately two weeks to edge the sidewalks and markers at the cemetery. Thus, a substantial full time crew has been required to maintain the grounds of the cemetery.

Riding grass trimmers adapted to trim grass around memorial markers in cemeteries are known. For example, one such known grass trimmer is known from U.S. Pat. No. 4,077,190 to Critts, in which a rotary drum is mounted on a vehicle and has a plurality of flexible whips extending outwardly from the drum along its entire length. When the drum is rotated at high speeds, the flexible whips are spun radially outward in a series of vertical planes to whip against the grass surrounding the memorial markers and sever the tops of the grass blades from their lower stalks. In other words, a majority or substantial number of the flexible whips mounted on the drum actually engage the upper surface of the marker as the riding vehicle traverses past the memorial markers. It will thus be appreciated that the majority of the flexible whips do not follow the contour of the memorial markers as they pass over the object. At the same time, with this prior art arrangement a substantial number of whips are required to trim the grass around the edges of the marker which are perpendicular or transverse to the direction of movement of the vehicle. Still further, since the whips move generally in the same direction as the grass which is growing over the edges of the markers, such grass stalks may not be trimmed to provide a neat well-manicured appearance. Accordingly, such an arrangement does not serve as an efficient and still effective means for accomplishing the desired trimming around the edges of the memorial marker and/or sidewalks.

These and other disadvantages of the prior art are overcome with the edging device in accordance with the present invention.

SUMMARY OF THE INVENTION

In accordance with the present invention, there is provided an edging device for trimming grass around the edges of objects set in the ground, the objects having at least first, second and third sides with the second side being transversely oriented to and between the first and third sides. The edging device in accordance with the present invention comprises a vehicle having a frame supported thereby. First, second and third edging means, each carried by the frame, are provided for edging the first, second and third sides of the object set in the ground respectively, the first edging means being adapted to follow the contour of the first edge of the object as the vehicle traverses past the object, the second edging means being adapted to follow the contour of the second edge of the object as the vehicle traverses past the object, and the third edging means being adapted to follow the contour of the third edge of the object as the vehicle traverses past the object. Also, adjustment means are provided for movably adjusting the position of one of the edging means relative to the other two edging means so that different size objects may be edged with the edging device. In this manner, grass around a series of objects set in the ground may be quickly, efficiently and neatly trimmed with the edging device in accordance with the present invention by simply driving the vehicle past the objects, thereby greatly improving the time and manpower required for edging.

In accordance with a preferred embodiment in which the objects to be edged generally comprise rectangular markers, the first and third edging means are adapted to follow the contour of the first and third parallel edges of the objects to trim the grass therearound with the second edging device being adapted to trim the transversely extending second and fourth parallel edges of the rectangular object. Additionally, the adjustment means is operable to adjust the position of the first edging means. This adjustment of the position of the first edging means allows markers of different widths to be trimmed with the edging device of the present invention.

Further, in accordance with a preferred embodiment, each of the edging means comprise rotatable trimming means having one or more flexible filaments which are adapted to rotate about respective horizontally extending axes, the axes of the first and third rotatable trimming means extending in substantially the same direction and the axis of rotation of the second rotatable trimming means extending in a transverse direction. Also in accordance with a preferred embodiment of the present invention, each of the rotatable trimming means are driven by a hydraulic motor, and the edging device includes hydraulic pressurizing means for pressurizing a hydraulic fluid to power the individual hydraulic motors.

Still further, in a preferred embodiment of the present invention, the first rotatable trimming means is slidably mounted on rail means, and the adjustment device includes means for slidably moving the first rotatable trimming means along the rail means, the rail means extending in a direction generally parallel to the axis of rotation of the first rotatable trimming means so that different width objects may be easily and quickly trimmed of grass.

These and further features and characteristics of the present invention will be apparent from the following detailed description in which reference is made to the enclosed drawings which illustrate a preferred embodiment of the present invention.

DETAILED DESCRIPTION OF THE PREFERRED EMBODIMENT

Figure 1:
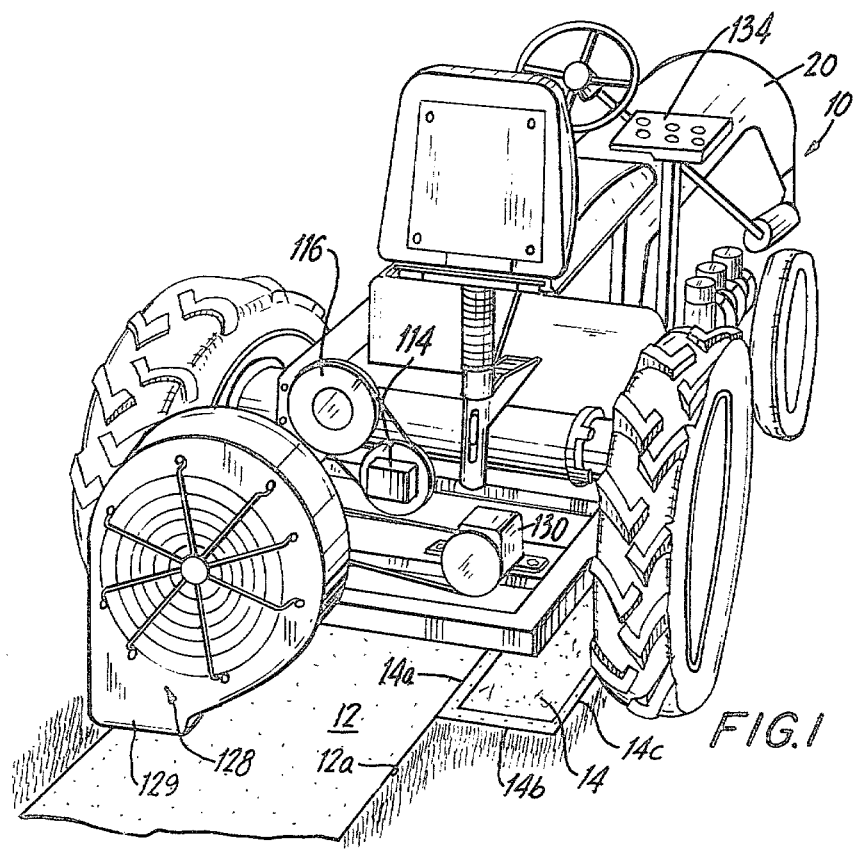
FIG. 1 is a rear perspective view of the edging device in accordance with the present invention, illustrating the edging device trimming grass around objects set in the ground, such as a sidewalk and memorial markers adjacent thereto.

Referring now to the drawings wherein like reference characters represent like elements, there is shown in FIG. 1 the edging device 10 in accordance with the present invention. As the edging device 10 is mainly intended for trimming the edges of sidewalks 12 and memorial markers 14 in cemeteries, the present invention will be described with reference to such use. However, it should be appreciated that the edging device 10 could also be used to trim grass around edges of other objects set in the ground, as will be apparent to persons skilled in the art.

More particularly, in the preferred embodiment, the objects whose edges are to be trimmed comprise sidewalks 12 and memorial markers 14 arranged adjacent thereto. As can best be seen in FIGS. 1 and 3, the memorial markers 14 are generally of a rectangular shape and have one side or edge 14a thereof abutting against the edge of the sidewalk 12. As can be appreciated, conventional lawnmowers will not trim the grass growing over the edges of the sidewalk 12 or memorial markers 14, even if the mowers ride over the memorial markers 14. Thus, the edges of the sidewalks 12 and memorial markers 14 need to be separately trimmed. The subsequent trimming operation which is required can be quite time consuming and require significant manpower, especially in a cemetery having several miles of sidewalks 12 and thousands of markers 14. The edging device 10 in accordance with the present invention is designed to accomplish this trimming operation in a more efficient and less time consuming manner to provide a completely manicured look for the cemetary.

The edging device 10 in accordance with the present invention generally includes an appropriate vehicle 20 such as for example a tractor which is adapted to traverse past the objects 12, 14 to be trimmed. The edging device 10 includes a pivotal frame member 22 mounted to the vehicle 20 thereof which in turn carries a plurality of individual edging or trimming means 24, 26, 28 each of which is adapted to follow the contour of an edge of an object 12, 14 to be trimmed as the vehicle 20 traverse past the objects 12, 14.

Figure 2:
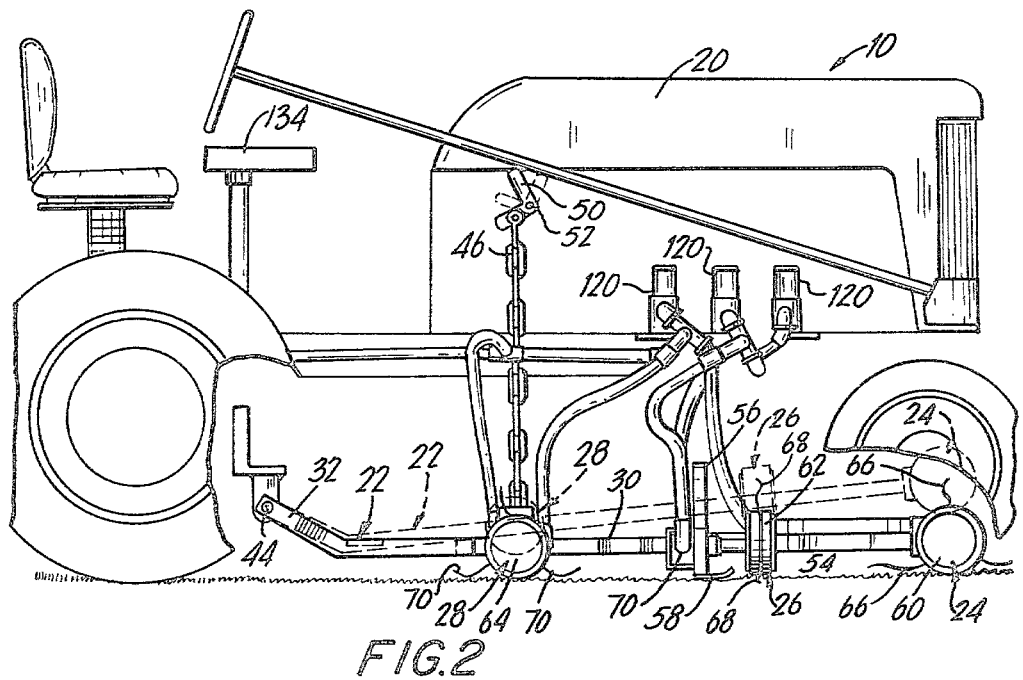
FIG. 2 is a side view of the edging device with portions thereof removed to illustrate a pivotally movable frame member, the frame member being shown in solid outline in its lowered trimming position and being shown in dotted outline in its raised, non-trimming position.
Figure 3:
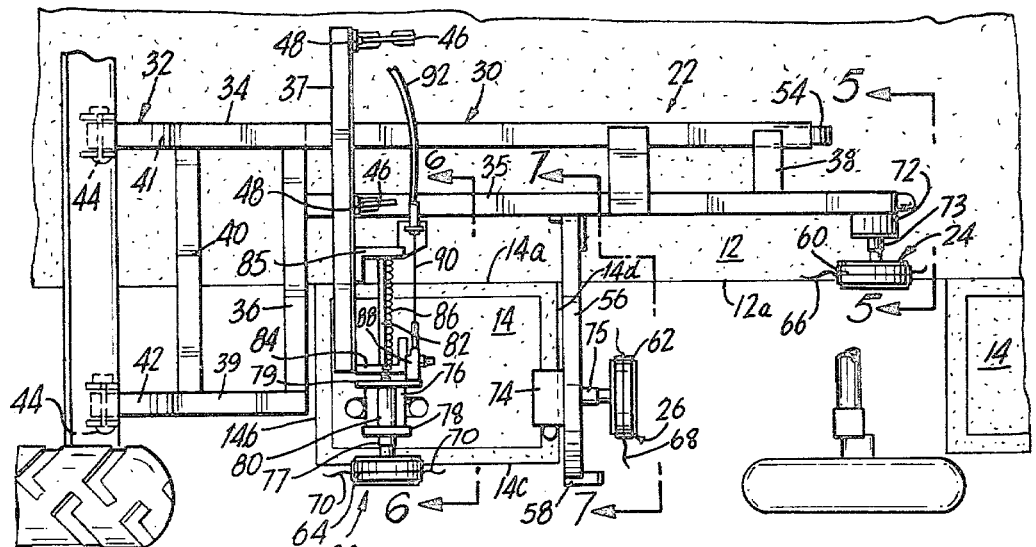
FIG. 3 is a top sectional view taken along lines 3—3 of FIG. 2 showing the first, second and third edging means in accordance with the present invention for edging grass around a memorial marker.

As best seen in FIG. 3, the frame member 22 may appropriately be constructed of angle irons welded together to provide a main frame portion 30 carrying the individual trimmers 24, 26, 28 and an inclined part 32 extending upwardly and rearwardly of the main frame portion 30. The main frame portion 30 preferably includes a pair of spaced, central forwardly extending support members or bars 34, 35 joined by transversely extending bars or straps 36, 37, 38. The main frame portion 30 also includes another forwardly extending bar 39 spaced from bar 34 and affixed to transversely extending bar 36, and another transversely extending bar 40 affixed to bars 34 and 39. The inclined portion 32 includes a pair of spaced bars 41, 42 affixed to the bars 34 and 39. The upper end of the inclined part 32 is pivotably mounted by suitable means, such as for example pins 44, to the underside of the vehicle 20 so that the entire frame may be pivotably mounted thereon to swing between a lowered trimming position (shown in solid outline in FIG. 2) in which the main frame portion 30 is parallel to the ground, and a raised non-trimming position (shown in dotted outline in FIG. 2) in which the main frame portion 30 is inclined upwardly.

The lowered position for the pivotal frame 22 is controlled by means of a pair of chain members 46 which are each attached at one end to the main frame portion 30, as at 48, and which at the other end are carried by rotatable L-shaped support brackets 50 which are rotatably mounted to the vehicle 20. More particularly, the L-shaped brackets 50 are secured on opposite sides of the tractor body to a bar or rod 52 passing through the tractor body. The bar 52 is rotatably mounted in the tractor to rotate about its longitudinal axis to in turn rotate the brackets 50 in a clockwise direction as shown in FIG. 2 to pivot the frame upwardly. Such a rotatable bar 52 and brackets 50 may for instance comprise part of a conventional lift mechanism of a conventional tractor, such as for example, a Farmall Cub Tractor manufactured by International Harvester.

This arrangement of a pivotal frame 22 supported by chains 46 is advantageous in the event that "high spots" are encountered by the frame 22 as the tractor 20 traverses past the sidewalks 12 and memorial markers 14. Specifically, if a high spot, such as a curb or the marker 14 itself, is encountered, the frame 22 will automatically be pivoted or lifted upwardly to clear the high spot and prevent damage to the trimmer devices 24, 26, 28 supported thereon. In this regard, an idler wheel 54 is provided on the forwardly extending bar 34 which is adapted to ride over high spots (see FIGS. 3 and 5).

Additionally, a transverse bar 56 for supporting the trimmer device 26 has a shoe 58 secured thereto at its lower end which is adapted to ride over high spots spaced laterally from the central portion of the tractor 20 (see FIGS. 2-4 and 6).

The frame 22 carries three individual trimmer devices 24, 26, 28 arranged in predetermined positions thereon for trimming grass blades from the stalks thereof around the objects (i.e., sidewalks 12 and markers 14) to be trimmed. In the preferred embodiment, each of these individual trimmers 24, 26, 28 comprises a rotary filament trimmer device which includes a rotatable head or housing 60, 62, 64 carrying one or more flexible flailing elements 66, 68, 70, for example nylon filaments (see FIGS. 4-7). As the rotatable housings 60, 62, 64 are rotated at high speeds, the flexible flailing elements 66, 68, 70 carried thereby are flung radially outwardly to move in generally vertical planes to cut or trim the ends of grass blades from the stalks thereof. Such rotary filament trimmers 24, 26, 28, as is well known in the art, may include a suitable filament supply means (not shown) within the rotatable housing 60, 62, 64 for supplying additional filament material as the ends of the filaments 66, 68, 70 wear out during operation. For instance, the rotary trimmers 24, 26, 28 may comprise commercially available three filament trimmers sold by Hoffco, Inc. under the name "Tri-Line." Rotation of the rotatable heads or housings 60, 62, 64 may be provided by any suitable means, such as for example motors 72, 74, 76 which are connected thereto.

Figure 4:
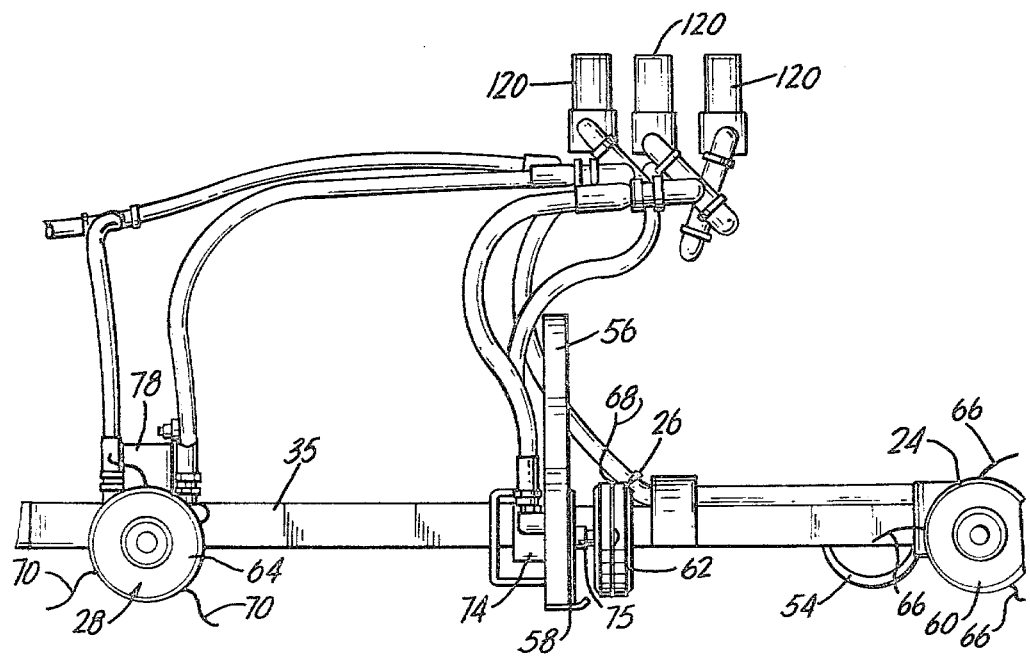
FIG. 4 is a side view of the three edging means mounted to the pivotal frame member in accordance with the present invention.
Figure 5:
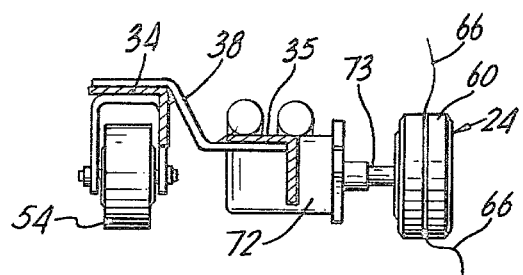
FIG. 5 is a sectional view taken along lines 5—5 of FIG. 4 showing one of the edging means in accordance with the present invention.

The individual trimmers 24, 26, 28 are mounted on the frame and oriented so that as the tractor 20 traverses past the objects 12, 14 to be trimmed, the flailing elements 66, 68, 70 of the trimmers 24, 26, 28 are adapted to roughly follow the contour of the edges of the objects 12, 14. More particularly, as best seen in FIGS. 3-5, one of the trimmers 24 is mounted at the forward end of the tractor 20 and is centrally located between the front wheels of the tractor 20 for trimming along the edge 12a of the sidewalk 12 in the cemetery. This forward trimmer 24 is positioned so that the flailing elements or filaments 66 thereof rotate in a plane which is substantially parallel to the direction of movement of the tractor 20, i.e., in line or parallel to the longitudinal centerline of the tractor 20. In the preferred embodiment, the motor 72 of the trimmer 24 is secured to the central forwardly extending bar 35 of the main frame portion 30 and has its drive shaft 73 extending perpendicularly of the longitudinal direction of the bar 35. The rotatable head or housing 60 carrying the filaments 66 is fastened to the drive shaft 73 to rotate therewith so that the flexible filaments 66 travel or move in a substantial vertical plane along the edge 12a of the sidewalk 12.

Figure 6:
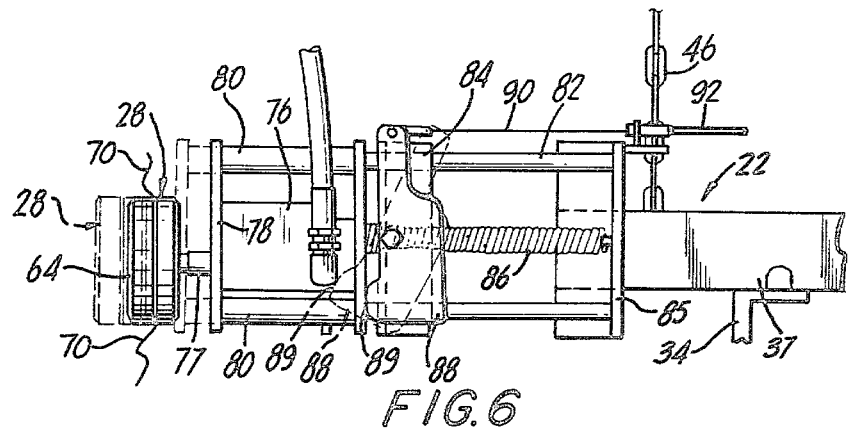
FIG. 6 is an elevational view taken along lines 6—6 of FIG. 4 illustrating the second or transverse edging means in accordance with the present invention.

The second trimmer 26, best seen in FIGS. 3, 4 and 6, is located rearwardly of the forward trimmer 24 and is oriented so that the flailing elements 68 thereof will rotate in a plane substantially perpendicular to the longitudinal centerline of the tractor 20. This transverse trimmer 26 is thus adapted to trim along the transversely extending edges 14b, 14d of the memorial markers 14 which extend perpendicularly outwardly from the sidewalk 12 (see FIG. 3). In the preferred embodiment, the motor 74 for the transverse trimmer 26 is mounted on the transversely extending bar 56 of the main frame portion 30 to have its drive shaft 75 extend substantially horizontally in a direction perpendicular to the transversely extending bar 56. The rotatable housing 62 is secured to the drive shaft 75 to rotate therewith so that the flexible filaments 68 thereof will travel or move in a substantially vertical plane. Thus, it will be appreciated that the plane of movement of the filaments 68 of the transverse trimmer 26 is perpendicular to the place of movement of the filaments 66 of the forward trimmer 24.

Figure 7:
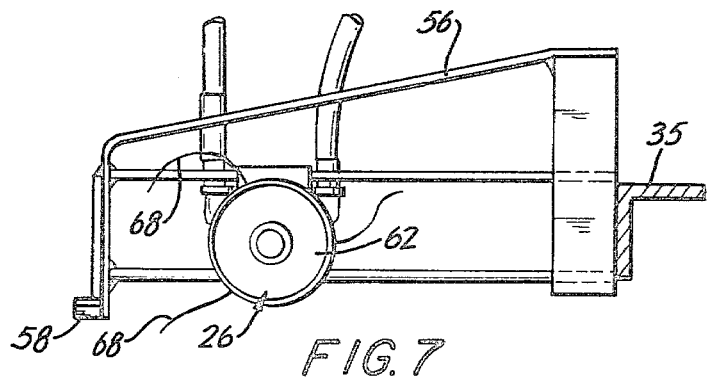
FIG. 7 is an enlarged sectional view taken along lines 7—7 of FIG. 4 illustrating another of the three edging means which is movably mounted on the frame member for movement relative to the outer edging means so that different size objects may be trimmed with the edging device.
Figure 8:
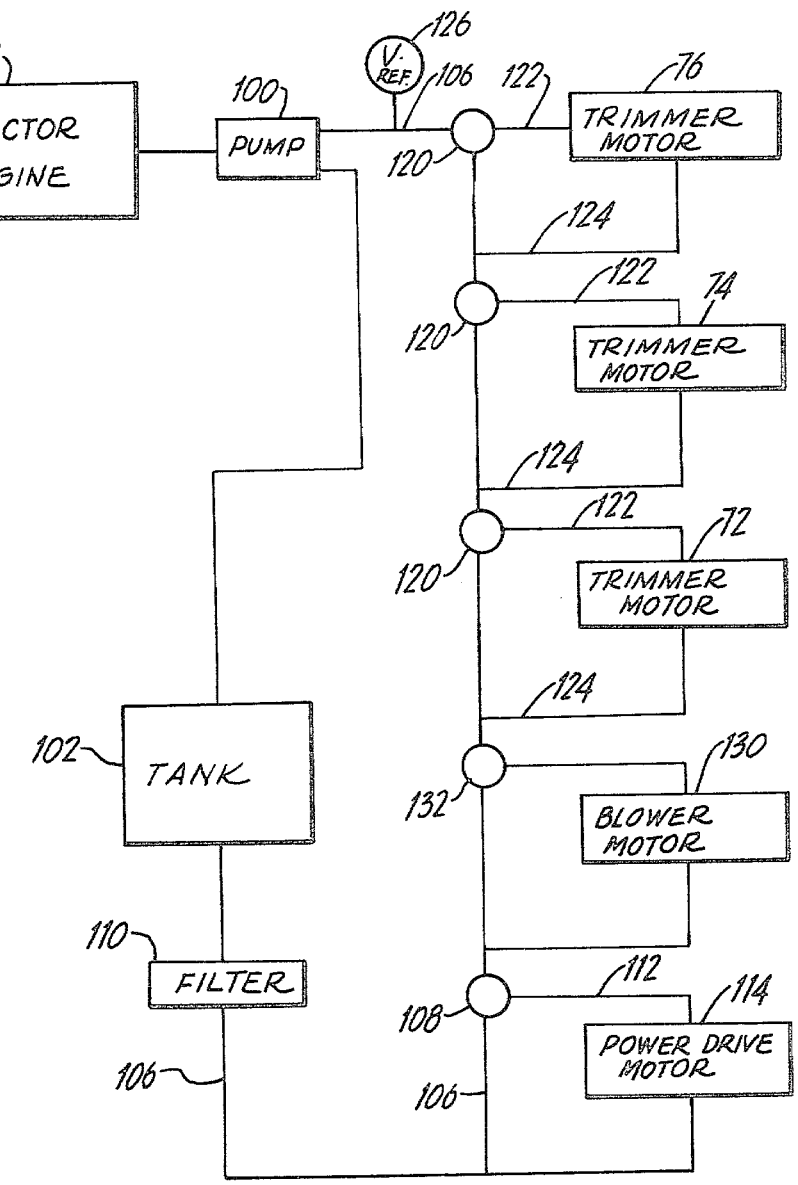
FIG. 8 is a schematic diagram of the hydraulic system for powering the edging device and the three edging means thereof.

As best seen in FIGS. 3, 4 and 7, the third trimmer 28 is adapted to follow the contour of the outer edge 14c of the memorial marker 14, i.e., the edge generally parallel to the sidewalk 12 and spaced therefrom. This trimmer 28 is located rearwardly of the other two trimmers 24, 26 and is mounted for lateral movement so that the position thereof may be easily adjusted to accommodate different size memorial markers 14. The flailing elements or filaments 70 of the trimmer 28 are adapted to rotate in a vertical plane generally parallel to the plane of movement of the flailing elements 66 of the forward trimmer 24, and thus perpendicular to the plane of movement of the flailing elements 68 of the transverse trimmer 26. More particularly, the third trimmer 28 includes a motor 76 having a horizontally extending drive shaft 77 extending generally perpendicular of the longitudinal centerline of the tractor 20. The rotatable housing 64 is secured to the drive shaft 77 of the motor 76 to rotate therewith so that the filaments 70 thereof move in a generally vertical plane parallel to the longitudinal centerline of the tractor 20.

Thus, it will be appreciated that by simply adjusting the position of the third trimmer 28, and in particular the filaments 70 thereof (with means to be described more fully hereinbelow), memorial markers 14 and sidewalks 12 in a cemetery can be easily trimmed by simply driving the vehicle 20 over and past the memorial markers 14 and sidewalks 12. More specifically, the tractor 20 is driven so that the forward trimmer 24 trims along the sidewalk edge 12a. When a memorial marker 14 is encountered, the transverse trimmer 26 is operated to trim along the pair of transversely extending edges 14b, 14d of the memorial marker 14 as the vehicle 20 slowly traverses thereover. The position of the rear trimmer 28 is adjusted outwardly so that its flailing elements or filaments 70 follow the contour of the outer edge 14c of the memorial marker 14. The flailing elements 66, 68, 70 of the trimmers 24, 26, 28 may be continuously operated as the vehicle 20 traverses past the memorial markers 14, or the rotation thereof may be stopped so as not to seriously or uselessly damage the elements or filaments 66, 68, 70 thereof.

In accordance with the preferred embodiment, the rear trimmer 28 is slidably mounted to the frame 22, and means are provided for slidably moving the trimmer 28 to accommodate different size objects, i.e., memorial markers 14 of different widths. More particularly, the trimmer motor 76 is mounted between a pair of transversely extending brackets 78, 79 with the drive shaft 77 extending laterally outwardly therefrom. The pair of brackets 78, 79 have a pair of vertically spaced tubular sleeves 80 secured thereto which extend in a direction away from the rotatable housing 64. These transversely extending sleeves 80 are adapted to receive therewithin a pair of transversely extending vertically spaced rods or bars 82 fixedly secured between a pair of bracket members 84, 85 which in turn are fixedly secured to the transversely extending bar 37 of the frame 22. As best seen in FIGS. 3 and 7, the ends of the tubular sleeves 80 facing the bars 82 are open through the bracket member 79 so that the rods 82 extending from the supporting bracket 84 may extend into and be slidably received within the tubular sleeves 80.

A suitable spring member 86 has one of its ends affixed to one of the bracket member 85 affixed to the frame 22 and the other end secured to the bracket member 79 carrying the trimmer 28 so that the trimmer support brackets 78, 79 are normally biased toward the center of the tractor 20, i.e., so that the adjacent bracket members 79 and 84 abut one another and with the rod members 82 fully received within the tubular sleeves 80. A cam lever member 88 is provided pivotally secured to the fixedly secured bracket member 84. The cam member 88 has a portion 89 thereof which is adapted to engage the vertically extending bracket member 79. Thus, when the cam member 88 is rotated in a clockwise direction as viewed in FIG. 7, the engaging portion of the cam member 88 forces the pair of brackets 78, 79 and thus the trimmer 28, horizontally outwardly away from the center of the tractor 20 to thereby adjust the position of the flailing elements or filaments 70 thereof.

As can be appreciated, the cam member 88 can be designed to provide a suitable range of movement of the movable trimmer 28 to accommodate different size objects, i.e., memorial markers 14, which might be encountered during a trimming operation, such as for example, by adjustment of the position of the pivotal connection to the bracket 84, the location of the engaging portion 89, etc. In the preferred embodiment, the movable trimmer 28 is normally positioned for trimming 12" wide markers 14, and is movable laterally outwardly approximately 2" for trimming of 14" wide markers 14. It will also be appreciated that the extent of movement of the trimmer 28 can be easily adjusted or controlled within the overall range of extension to provide the desired positioning of the trimmer 28 with respect to any object to be encountered. This is accomplished by simply controlling the amount of pivotal movement of the cam member 88.

Pivotal movement of the cam member 88 is accomplished through the use of a flexible cable 90 which has one end attached to the upper end of the cam member 88 and which extends through a flexible sheath 92 which leads to a suitable control member which may be easily operated by the vehicle operator. For example, the other end of the flexible cable 90 may be attached to a pedal on the vehicle 20 (for example, a pedal similar to the conventional clutch pedal of the tractor) so that depression of the pedal (not shown) will cause the cable 90 to retract within the flexible sheath 92 to pull or pivot the cam member 88 in a clockwise direction as shown in FIG. 7 against the biasing force of the spring 86. When the pedal is released, the biasing force of the spring 86 serves to return the trimmer support brackets 78, 79 to their normal retracted position. In the preferred embodiment, the clutch of the tractor 20 has been disengaged and the cable 90 is attached to the clutch pedal. However, it of course will be appreciated, that other types of arrangements for extending the trimmer 28 could be utilized, and in particular it is not necessary that a pedal be used. For example, a suitable lever arm could be secured to the tractor 20 and have the end of the cable 90 attached thereto so that movement of the lever arm would serve to retract the cable 90.

Also in the preferred embodiment, each of the motors 72, 74, 76 for rotatably driving the rotary housings 60, 62, 64 are hydraulic motors. Additionally, the motive force for the vehicle 20 comprises hydraulic means. For this purpose, the edging device 10 preferably includes hydraulic pressurizing means, such as for example, a hydraulic pump for pressurizing a hydraulic fluid to power the vehicle 20 as well as each of the hydraulic motors 72, 74, 76 of the trimmers 24, 26, 28.

More particularly, with reference to the schematic diagram of FIG. 7, a hydraulic pump 100 mounted on the tractor 20 is operatively connected with a tank 102 of hydraulic fluid for pressurizing the fluid. The pump 100 is driven by the tractor engine 104. The pressurized hydraulic fluid is directed from the pump 100 through the system via suitable conduits to the hydraulic motors for powering the vehicle 20 and the rotary housings 60, 62, 64 of the trimmers 24, 26, 28 and is then returned to the tank 102 which in essence acts as a reservoir. The tank 102 may suitably be provided with a filter plug and a vent.

In the preferred embodiment, a suitable variable speed control valve 108 is preferably provided in the hydraulic line 106 leading from the pump 100 to the tank 102 for controlling the supply of hydraulic fluid to a power drive motor 114 through line 112. The power drive motor 114, via means of a belt drive connection 116 attached thereto and to the power take off unit of the tractor 20, provides motive force to the rear wheels of the tractor 20. The tractor motor 114 and belt drive connection 116 is shown for example in FIG. 1. The variable speed control valve 108 may be a conventional hydraulic variable speed control valve as is known in the art for supplying fluid to the power drive motor 114. In the line 106, there are also provided a series of hydraulic solenoids 120 which are electrically operable to supply hydraulic fluid to the various hyraulic motors 72, 74, 76 for driving the trimmers 24, 26, 28. The hydraulic solenoids 120 are normally opened, and the hydraulic fluid is simply directed therethrough along line 106. When the solenoids 120 are closed, the hydraulic fluid is directed to the trimmer motors 72, 74, 76, such as via lines 122, to rotate the rotary housings 60, 62, 64 and flexible flailing elements 66, 68, 70 carried thereby. Suitable return lines 124 are provided from each of the trimmer hydraulic motors 72, 74, 76. Also, a suitable pressure relief valve 126 may be provided in the hydraulic flow line 106. A filter 110 may also be provided in the hydraulic line leading from the valve 108 and/or power drive motor 114 to the tank 102 for filtering the hydraulic fluid being returned to the tank 102.

The hydraulic solenoids 120 may be conventional solenoids such as for example AMVAC Fluid Power Solenoids (5-014A-6-A-12 volt DC) manufactured by Wheeling Illinois. The hydraulic pump 100 may for example be a five gallon per minute hydraulic pumping unit for pumping hydraulic fluid at 1800 psi when operated at 1200 rpm. The hydraulic motors 72, 74, 76 for each of the trimmers 24, 26, 28 may for example be 4½ gallon per minute motors driven at 2500 rpm at 1200 psi. The power drive motor 114 may for example be a 4½ gallon motor operable at 1500 rpm at 1200 psi. In this regard, the hydraulically driven tractor 20 is preferable in connection with the edging operation since the hydraulically driven tractor 20 will not move too fast and further can be smoothly controlled during traversing about the objects 12, 14 to be trimmed. Also, with the hydraulically powered tractor 20 including a variable speed control valve 108, a clutch assembly is no longer necessary, and thus the clutch pedal may be utilized for moving of the one trimmer 28 relative to the other two trimmers 24, 26.

Also in accordance with the preferred embodiment of the present invention, the edger device 10 includes a blower unit 128 carried by the tractor 20 which serves, when operated, to clean off trimmed pieces of grass from the sidewalk 12 and/or memorial markers 14. The blower unit 128 may for example comprise a conventional blower adapted to be driven, as with the other devices, by means of a hydraulic motor 130 (such as for example through a belt drive unit) for directing a stream of air against the ground as the tractor 20 traverses past the objects 12, 14. The hydraulically operated motor 130 for the blower 128 may comprise a hydraulic motor similar to the other motors utilized in connection with the edger device 10 and which is controlled by means of an electrically operated hydraulic solenoid 132. In the preferred embodiment, the blower unit 128 is attached to the rear of the tractor 20 and includes an air outlet 129 directed downwardly for blowing and cleaning of trimmed grass from the sidewalk 12 and/or memorial markers 14.

Thus, it will be appreciated that the edger device 10 in accordance with the present invention may be operated by simply turning on the tractor engine 104 to operate the hydraulic pump 100 to draw hydraulic fluid from the tank 102 and pressurize the system. By suitable setting of the variable speed control valve 108, the tractor 20 begins to traverse along the sidewalk 12 past the memorial markers 14. In this instance, the operator steers the tractor 20 so that the forward trimmer 24 follows the contour of the sidewalk edge 12a. The hydraulically operated motor 72 for the front trimmer 24 may be actuated by means of a toggle switch on the control panel 134 which serves to close the solenoid 120 therefor to direct hydraulic fluid through the transverse motor 72 so that the flexible flailing elements 66 are rapidly rotated. As the tractor 20 slowly moves along the edge of the sidewalk 12, the flailing elements 66 on the front trimmer 24 serve to trim the grass along the edge 12a of the sidewalk 12.

When a memorial marker 14 along the edge 12a of the sidewalk 12 is encountered, the transverse trimmer 26 is actuated to trim the transverse edges 14b, 14d of the marker 14 as the tractor 20 continues to move therepast. Specifically, when the rearmost edge 14b of the marker 14 (i.e., the first transverse edge 14b of the marker 14 encountered by the tractor 20) is aligned with the transverse trimmer 26, the operator depresses a push button switch on the control panel 134 to activate the hydraulic solenoid 120 therefor to direct hydraulic fluid to the transverse trimmer motor 74 to cause the rotary housing 62 connected thereto to rotate rapidly. The transverse trimmer 26 need only remain on momentarily as the tractor 20 continues to move so as to trim along the rear transverse edge 14b of the memorial marker 14. That is, the push button switch need only be depressed for a short period of time. Thereafter, as the tractor 20 continues to move, the push button controlling the solenoid 120 for the transverse trimmer 26 is again depressed momentarily when the transverse trimmer 26 is aligned with the forward transverse edge 14d of the memorial marker 14 to trim the grass therealong. In each instance that the transverse trimmer 26 is actuated, the flailing filaments 68 follow the contour of the transverse edges 14b, 14d of the memorial marker 14. Next (or possibly before the forward transverse edge 14d is encountered, depending on the relative spacing between the transverse trimmer 26 and the rear trimmer 28), the rear trimmer 28 is positioned to be aligned with the outer side edge 14c of the memorial marker 14 and to trim the grass therealong as the tractor 20 continues to transverse past the marker 14. This alignment is accomplished by suitable depression of the clutch pedal to an appropriate extent. As the trimmer 28 encounters the outer side edge 14c, it is actuated by means of depressing of a push button switch on the control panel 134 to cause the rotary housing 64 thereof to rotate rapidly as the tractor 20 traverses past the marker 14 to thereby trim the outer edge 14c of the memorial marker 14. When trimming of the outer side edge 14c is completed, the trimmer 28 is turned off by release of the push button until the next marker 14 is encountered.

During this entire operation, the forward trimmer 24 may continue to be operated by simply leaving the toggle switch in the "on" position, or if desired, the toggle switch could be turned off. Also, the blower unit 128 may be continuously operated by flipping of a toggle switch therefor on the control panel 134 to the "on" position to blow air onto the objects 12, 14 to clean the trimmed grass therefrom.

Therefore, it will be appreciated that in accordance with the present invention, the edger device 10 provides for efficient and quick trimming of grass around objects 12, 14 set in the ground in a relatively convenient manner since only a single operator is required for the trimming operation. For example, it has been found that one man can accomplish the trimming of approximately five miles of sidewalk 12 and ten thousand markers 14 with the edger device 10 in accordance with the present invention in two and one-half weeks, and further is able to do the same job better and more efficiently than prior art methods which utilize crews of four men with commerical hand edgers and which previously required two weeks for edging the sidewalks and markers in a cementery.

Thus, with the present invention there is provided an edger device 10 for trimming of grass around objects set in the ground, for example sidewalks 12 and/or memorial markers 14 adjacent thereto. The edger device 10 comprises a vehicle 20 for traversing past the objects 12, 14 and which carries a frame 22 thereon. Three individual trimmers 24, 26, 28 are in turn carried by the frame 22 and are adapted to follow the contour of the edges or sides of the objects 12, 14 as the vehicle 20 traverses past the objects 12, 14. One of the trimmers 28 is movably supported on the frame 22 for adjusting the position of the trimmer 28 relative to the other two trimmers 24, 26 so that different size objects 14 may be accommodated. In this regard, suitable adjustment means are provided for adjusting the position of the one movable trimmer 28. Also, in accordance with the present invention, there may be provided a blower unit 128 for cleaning off trimmed grass from the objects 12, 14 as the vehicle 20 traverses therepast. Further, the vehicle 20 and the trimmers 24, 26, 28 may effectively be operated by a hydraulic pressurizing means 100.

While the preferred embodiment of the present invention has been shown and described, it will be understood that such is merely illustrative and that changes may be made without departing from the scope of the invention as claimed.

What is claimed is:

1. An edging device for trimming grass around the edges of objects set in the ground, the objects having at least first, second and third sides with said second side being transversely oriented to and between said first and third sides, said edging device comprising:

a vehicle;

a frame supported by said vehicle;

first rotatable trimming means carried by said frame for edging said first side of the object set in the ground, said first rotatable trimming means being rotatable about a substantially horizontal axis and adapted to follow the contour of said first edge of said object as said vehicle traverses past said object;

second rotatable trimming means carried by said frame for edging said second side of said object set in the ground, said second rotatable trimming means being rotatable about a substantially horizontal axis and adapted to follow the contour of said second edge of said object as said vehicle traverses past said object, the axis of rotation of said second rotatable trimming means being transversely oriented relative to the axis of rotation of said first rotatable trimming means;

third rotatable trimming means carried by said frame for edging said third side of said object set in the ground, said third rotatable trimming means being rotatable about a substantially horizontal axis and adapted to follow the contour of said third edge of said object as said vehicle traverses past said object, the axis of rotation of said third rotatable trimming means being transversely oriented relative to the axis of rotation of said second rotatable trimming means; and adjustment means for movably adjusting the position of one of said rotatable trimming means relative to the other of said rotatable trimming means so that different size objects may be edged with said edging device.

2. The edging device of claim 1 wherein the axis of rotation of said first and third trimming means are parallel.

3. The edging device of claim 2 wherein the axis of rotation of said second trimming means is perpendicular to the axis of rotation of said first and third trimming means.

4. The edging device of claim 1 wherein each of said trimming means includes a rotatable housing rotatable about its respective horizontal axis, at least one flexible flailing element attached to said rotatable housing, and a motor attached to said housing for rotating said housing and said flexible flailing element attached thereto.

5. The edging device of claim 4 wherein said flailing element of each of said trimming means is adapted to follow the contour of one of said sides of said object to thereby trim grass around said object.

6. The edging device of claim 5 wherein each of said motors comprise a hydraulic motor, and wherein said edging device further includes hydraulic pressurizing means for generating hydraulic pressure to power said motors.

7. The edging device of claim 6 wherein said one rotatable trimming means comprises said first rotatable trimming means, and wherein said adjustment means is operable to movably adjust the position of said first rotatable trimming means along a direction which is perpendicular to said first and third sides of said object.

8. The edging device of claim 7 wherein said adjustment means is operable to movably adjust the position of said first rotatable trimming means along a first direction which extends in the same direction as said horizontal axis of rotation of said first rotatable trimming means.

9. The edging device of claim 8 wherein said adjustment means includes a support rail means carried by said frame and extending in said first direction; guide means slidably engaging said rail means and carrying said first rotatable trimming means; and moving means for moving said guide means along said rail means to adjust the position of said first rotatable trimming means.

10. The edging device of claim 9 wherein said adjustment means further includes bias means for biasing said guide means toward a first position along said rail means, and wherein said moving means is operable to move said guide means against the biasing force of said biasing means to move said guide means in a direction away from said first position.

11. The edging device of claim 10 wherein said moving means comprises a pivotable cam member pivotably carried by said rail means and having a portion engaging said guide means for moving said guide means away from said first position as said cam member is pivoted, and cable means connected to said cam member for pivotably moving said cam member.

12. The edging device of claim 1 further including means for pivotably mounting said frame to said vehicle for pivotable movement between a lowered trimming position in which said first, second and third rotatable trimming means are operative to trim grass around said object and a raised non-trimming position in which said first, second and third rotatable trimming means are displaced from said object.

13. The edging device of claim 1 further including blower means carried by said vehicle for blowing grass trimmed around said object by said first, second and third rotatable trimming means away from said object as said vehicle traverses past said object.

14. The edging device of claim 13 further including a source of hydraulic fluid, hydraulic pressurizing means for pressurizing said hydraulic fluid, and means operatively connecting said pressurized hydraulic fluid to said blower means and said vehicle for powering said blower means and said vehicle.

15. The edging device of claim 14 further including means operatively connecting said pressurized hydraulic fluid to said first, second and third rotatable trimming means for powering said first, second and third rotatable trimming means.

* * * * *